(12) United States Patent
Byun

(10) Patent No.: US 11,392,309 B2
(45) Date of Patent: Jul. 19, 2022

(54) MEMORY SYSTEM FOR PERFORMING MIGRATION OPERATION AND OPERATING METHOD THEREOF

(71) Applicant: SK hynix Inc., Icheon (KR)

(72) Inventor: Eujoon Byun, Yongin (KR)

(73) Assignee: SK hynix Inc., Icheon (KR)

( * ) Notice: Subject to any disclaimer, the term of this patent is extended or adjusted under 35 U.S.C. 154(b) by 129 days.

(21) Appl. No.: 16/885,025

(22) Filed: May 27, 2020

(65) Prior Publication Data

US 2021/0117122 A1    Apr. 22, 2021

(30) Foreign Application Priority Data

Oct. 18, 2019    (KR) .......................... 10-2019-0130019

(51) Int. Cl.
*G06F 3/06* (2006.01)
*G06F 12/02* (2006.01)

(52) U.S. Cl.
CPC ............ *G06F 3/0647* (2013.01); *G06F 3/064* (2013.01); *G06F 3/0617* (2013.01); *G06F 3/0653* (2013.01); *G06F 3/0659* (2013.01); *G06F 3/0673* (2013.01)

(58) Field of Classification Search
None
See application file for complete search history.

(56) References Cited

U.S. PATENT DOCUMENTS

2016/0253257 A1* 9/2016 Kim .................... G06F 3/061
711/166

FOREIGN PATENT DOCUMENTS

KR          101861170 B1    5/2018

* cited by examiner

*Primary Examiner* — Michael Alsip

(57) ABSTRACT

A memory system includes a nonvolatile memory including a first region and a second region, and a controller configured to manage a migration operation for a plurality of memory blocks included in the first region and the second region. The controller includes a migration module configured to perform the migration operation by selecting one or more victim blocks based on a number of valid pages of each memory block included in the first region when there is no free storage space in the first region, selecting one or more destination blocks in the second region that respectively correspond to the number of victim blocks, and swapping type information of each of the one or more victim blocks in the first region for type information of a corresponding one of the one or more destination blocks in the second region.

16 Claims, 11 Drawing Sheets

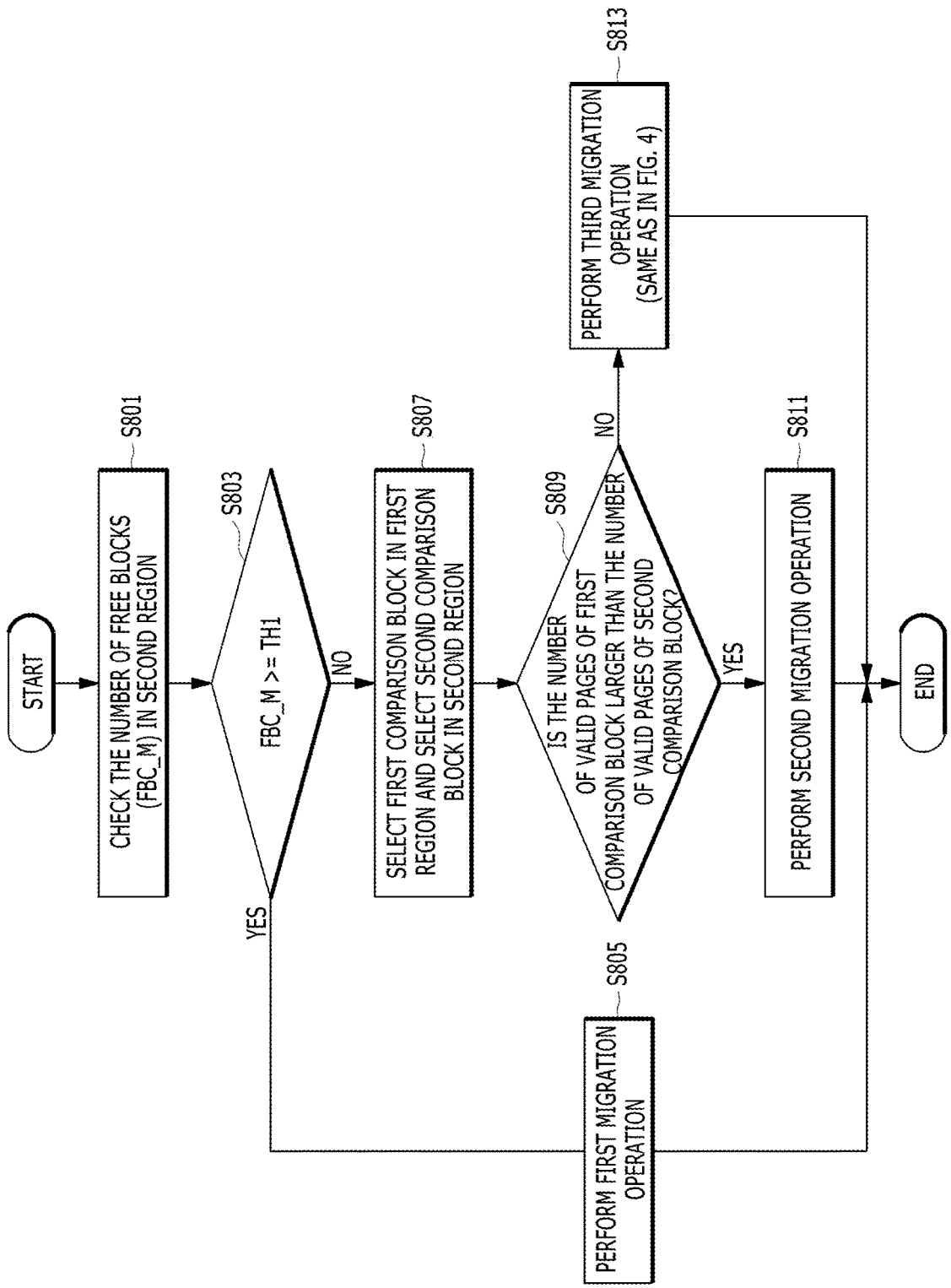

MEMORY SYSTEM FOR PERFORMING MIGRATION OPERATION AND OPERATING METHOD THEREOF

CROSS-REFERENCE TO RELATED APPLICATION

This application claims priority under 35 U.S.C. § 119 to Korean Patent Application No. 10-2019-0130019 filed on Oct. 18, 2019, which is incorporated herein by reference in its entirety.

BACKGROUND

1. Field

Embodiments of the present disclosure relate to a semiconductor device, and more particularly, to a memory system including a nonvolatile memory cell and a method of operating the same.

2. Discussion of the Related Art

Recently, the paradigm for the computer environment has shifted to ubiquitous computing, which allows computer systems to be used anytime and anywhere. As a result, the use of portable electronic devices such as mobile phones, digital cameras, and laptop computers has rapidly increased. In general, such portable electronic devices use a memory system including a memory device, that is, a data storage device. The data storage device is used as a main memory device or an auxiliary memory device of the portable electronic devices.

SUMMARY

Various embodiments are directed to a memory system that, when there is no free storage space in a first region in a nonvolatile memory including the first region and a second region, manages a storage space of the first region by selecting one or more memory blocks based on the number of valid pages among a plurality of memory blocks included in the first region, selecting a free block included in the second region in correspondence to the number of selected memory blocks, and swapping position information of the selected one or more memory blocks of the first region for position information of the free block of the second region, and an operating method thereof.

In an embodiment, A memory system, comprising: a nonvolatile memory including a first region and a second region; and a controller configured to manage a migration operation for a plurality of memory blocks included in the first region and the second region, wherein the controller comprises: a migration module configured to perform the migration operation by selecting one or more victim blocks based on a number of valid pages of each memory block included in the first region when there is no free storage space in the first region, selecting one or more destination blocks in the second region that respectively correspond to the number of victim blocks, and swapping type information of each of the one or more victim blocks in the first region for type information of a corresponding one of the one or more destination blocks in the second region.

In an embodiment, A method of operating a memory system that includes a nonvolatile memory including a first region and a second region and a controller for managing the nonvolatile memory, the method comprising: selecting a first comparison block from among memory blocks in the first region and selecting a second comparison block from among memory blocks in the second region; comparing a number of valid pages of the first comparison block and a number of valid pages of the second comparison block and selecting the second comparison block as a victim block when the number of valid pages of the second comparison block is smaller than the number of valid pages of the first comparison block; copying valid data stored in the victim block of the second region into an open block in the second region; performing an erase operation on the victim block of the second region and selecting the victim block on which the erase operation has been performed as a destination block; checking a number of destination blocks selected in the second region and selecting one or more victim blocks among a plurality of source blocks in the first region in correspondence to the number of destination blocks; and swapping type information of the one or more victim blocks selected in the first region for type information of the destination blocks of the second region.

In an embodiment, a method of operating a memory system that includes a nonvolatile memory including a first region and a second region and a controller for managing a migration operation for a plurality of memory blocks included in the first region and the second region, the method comprising: selecting one or more victim blocks among a plurality of source blocks in the first region based on a number of valid pages each of the plurality of source blocks when there is no free storage space in the first region; performing a migration operation by selecting one or more destination blocks from among memory blocks included in the second region based on the one or more victim blocks; and swapping type information of the one or more victim blocks of the first region for type information of the one or more destination blocks of the second region.

In accordance with the memory system and the operating method thereof according to various embodiments, when there is no free storage space in a first region in a nonvolatile memory including the first region and a second region, it is possible to reduce a data movement operation between the first region and the second region, and to reduce the number of erases of the first region and the second region, thereby performing an efficient migration operation.

BRIEF DESCRIPTION OF THE DRAWINGS

FIG. 5 to FIGS. 7A and 7B are diagrams for illustrating an operation of a migration module in accordance with an embodiment.

FIG. 8 to FIG. 10 are diagrams for illustrating a migration operation in accordance with an embodiment.

DETAILED DESCRIPTION

The following description focuses on features and aspects of various embodiments of the present invention. Well-known information may be omitted in order not to unnecessarily obscure subject matter of the present invention.

Various embodiments are described in more detail below with reference to the accompanying drawings. Throughout the specification, reference to "an embodiment," "another embodiment" or the like is not necessarily to only one embodiment, and different references to any such phrase are not necessarily to the same embodiment(s).

Figure 1:
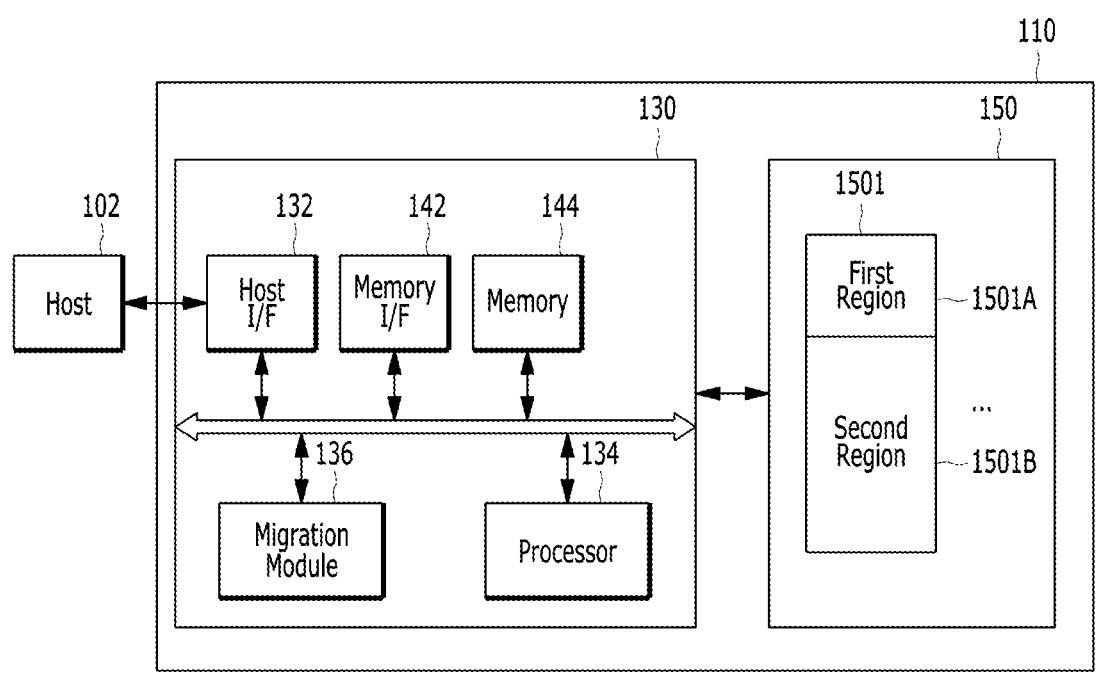
FIG. 1 is a diagram for illustrating a data processing system including a memory system in accordance with an embodiment.

FIG. 1 is a block diagram illustrating a data processing system 100 including a memory system 110 in accordance with an embodiment.

Referring to FIG. 1, the data processing system 100 may include a host 102 and the memory system 110.

The host 102 may be embodied by any of various electronic devices, for example, portable electronic devices such as a mobile phone, an MP3 player, and a laptop computer, or electronic devices such as a desktop computer, a game machine, a television (TV), and a projector, that is, any of wired and wireless electronic devices.

Also, the host 102 includes at least one operating system (OS). The operating system generally manages and controls the functions and operations of the host 102, and provides interoperability between the host 102 and a user using the data processing system 100 or the memory system 110. The operating system supports functions and operations corresponding to the user's purpose of use and the use of the operating system. For example, the operating system may be a general operating system or a mobile operating system depending on the mobility of the host 102. The general operating system may be a personal operating system or an enterprise operating system depending on the user's usage environment. For example, the personal operating system configured to support a service providing function for a general user may include Windows and Chrome, and the enterprise operating system configured to secure and support high performance may include Windows server, Linux, and Unix. The mobile operating system configured to support a mobility service providing function and a system power saving function to users may include Android, iOS, Windows mobile, etc. The host 102 may include a plurality of operating systems, and executes the operating systems to perform operations with the memory system 110 in correspondence to a user's request. The host 102 transmits a plurality of commands corresponding to a user's request to the memory system 110, and accordingly, the memory system 110 performs operations corresponding to the commands, that is, operations corresponding to the user's request.

The memory system 110 operates in response to a request of the host 102, and, in particular, stores data to be accessed by the host 102. In other words, the memory system 110 may be used as a main memory device or an auxiliary memory device of the host 102. The memory system 110 may be implemented as any one of various kinds of storage devices depending on a host interface protocol which is coupled with the host 102. For example, the memory system 110 may be implemented as any one of a solid state driver (SSD), a multimedia card (e.g., an MMC, an embedded MMC (eMMC), a reduced size MMC (RS-MMC), and a micro-MMC), a secure digital card (e.g., an SD, a mini-SD, and a micro-SD), a universal serial bus (USB) storage device, a universal flash storage (UFS) device, a compact flash (CF) card, a smart media card, and a memory stick.

Any of the storage devices which implement the memory system 110 may include a volatile memory device such as a dynamic random access memory (DRAM) and/or a static random access memory (SRAM), or a nonvolatile memory device such as a read only memory (ROM), a mask ROM (MROM), a programmable ROM (PROM), an erasable programmable ROM (EPROM), an electrically erasable and programmable ROM (EEPROM), an ferroelectric random access memory (FRAM), a phase change RAM (PRAM), a magnetic RAM (MRAM), and/or a resistive RAM (RRAM).

The memory system 110 includes a memory device 150 which stores data to be accessed by the host 102, and a controller 130 which controls storage of data in the memory device 150.

The controller 130 and the memory device 150 may be integrated into one semiconductor device. For instance, the controller 130 and the memory device 150 may be integrated into one semiconductor device and configure a solid state drive (SSD). In the case where the memory system 110 is used as an SSD, the operating speed of the host 102 which is coupled to the memory system 110 may be improved. The controller 130 and the memory device 150 may be integrated into one semiconductor device to form a memory card such as a personal computer memory card international association (PCMCIA) card, a compact flash (CF) card, a smart media card (e.g., an SM and an SMC), a memory stick, a multimedia card (e.g., an MMC, an RS-MMC, and a micro-MMC), a secure digital card (e.g., an SD, a mini-SD, a micro-SD, and an SDHC), and/or a universal flash storage (UFS) device.

In another embodiment, the memory system 110 may be disposed in a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various component elements configuring a computing system.

The memory device 150 may include a plurality of nonvolatile memories and may perform operations (for example, a read operation, a write operation, and the like) corresponding to requests of the controller 130 under the control of the controller 130. For example, for illustrative convenience, FIG. 1 illustrates one nonvolatile memory 1501. The nonvolatile memory 1501 may include a first region 1501A and a second region 1501B. The first region 1501A may include a buffer region, and the second region 1501B may include a main region. As illustrated in FIG. 1, the first region 1501A and the second region 1501B may be implemented as one memory device. However, in another embodiment, the first region 1501A and the second region 1501B may be implemented as individual memory devices, respectively.

For example, the first region 1501A may be implemented as a memory that performs a high speed operation, and a mapping scheme suitable for the high speed operation may be applied to the first region 1501A. That is, the first region 1501A may be a high performance write buffer region allocated to use some of a plurality of memory blocks included in the nonvolatile memory 1501 as a memory for performing the high speed operation. Furthermore, the first region 1501A may be configured as a single-level flash memory (SLC flash memory) that stores 1-bit data per memory cell. The size of the first region 1501A may be determined based on the total capacity of the nonvolatile memory 1501 and determined corresponding to an over provisioning region and the number of logical block addresses (LBAs) corresponding to the nonvolatile memory 1501.

On the other hand, the second region 1501B may be implemented as a memory that performs a low speed operation, and a mapping scheme suitable for the low speed operation may be applied to the second region 1501B. The second region 1501B may be configured as a multi-level flash memory (MLC flash memory) that stores N-bit data (N is an integer equal to or more than 2) per memory cell. For example, the second region 1501B may be configured as a multi-level flash memory that stores 3-bit data per memory cell. Since the second region 1501B needs to store 3-bit data per memory cell, it may take a longer time to perform signal processing and error correction operations, so that the processing speed in the second region 1501B may be relatively slower than the write operation speed in the first region 1501A.

In the memory system 110, the controller 130 controls the memory device 150 in response to a request from the host 102. For example, the controller 130 provides the host 102 with data read from the memory device 150, and stores data provided by the host 102 in the memory device 150. To this end, the controller 130 controls operations of the memory device 150, such as a read operation, a write or program operation, an erase operation, and the like.

More specifically, the controller 130 includes a host interface unit (host I/F) 132, a processor 134, a migration module 136, a memory interface unit (memory I/F) 142, and a memory 144.

The host interface unit 132 is for handling commands, data, and the like transmitted from the host 102. By way of example but not limitation, the host interface unit 132 may include a command queue (not shown). The command queue can sequentially store at least some of commands, data, and the like transmitted from the host 102 and output them to a cache controller (not shown) in their stored order.

The host interface unit 132 processes the commands and data from the host 102, and may communicate with the host 102 using at least one of various interface protocols such as universal serial bus (USB), multimedia card (MMC), peripheral component interconnect express (PCI-e or PCIe), serial attached SCSI (SAS), serial advanced technology attachment (SATA), parallel advanced technology attachment (PATA), small computer system interface (SCSI), enhanced small disk interface (ESDI), integrated drive electronics (IDE), and mobile industry processor interface (MIPI). The host interface unit 132 may be driven through firmware referred to as a host interface layer (HIL), which is a region for exchanging data with the host 102.

The memory interface unit 142 serves as a memory interface and/or a storage interface in order to perform interfacing between the controller 130 and the memory device 150, so that the controller 130 may control the memory device 150 in response to a command from the host 102. The memory interface unit 142 generates control signals for controlling the memory device 150 and processes data under the control of the processor 134. The memory interface unit 142 is a NAND flash controller (NFC) when the memory device 150 is a flash memory, in particular, when the memory device 150 is a NAND flash memory. The memory interface unit 142 may support an interfacing operation which processes a command and data between the controller 130 and the memory device 150. For example, the memory interface unit 142 may support a NAND flash interface to perform data input/output between the controller 130 and the memory device 150. The memory interface unit 142 may be driven through firmware referred to as a flash interface layer (FIL), which is a region for exchanging data with the memory device 150.

The memory 144, as a working memory of the memory system 110 and the controller 130, stores data for driving the memory system 110 and the controller 130. For example, when the controller 130 controls the memory device 150 in response to a command from the host 102, the controller 130 may provide data read from the memory device 150 to the host 102, and/or store data provided by the host 102 in the memory device 150. To this end, when the controller 130 controls the operations of the memory device 150, such as read, write, program, and erase operations, the memory 144 stores data needed to allow such operations to be performed by the memory system 110. That is, the memory 144 stores data required to perform such operations between the controller 130 and the memory device 150.

The memory 144 may be realized by a volatile memory. For example, the memory 144 may be realized by a static random access memory (SRAM) or a dynamic random access memory (DRAM). Furthermore, the memory 144 may be disposed within the controller 130 as shown in FIG. 1. Alternatively, the memory 144 may be external to the controller 130, and in this regard, may be realized as a separate external volatile memory in communication with the controller 130 through a memory interface.

As described above, the memory 144 stores data required to perform read and write operations between the host 102 and the memory device 150, and stores read and write data when performing the read and write operations. For such data storage, the memory 144 may be used as one or more of a program memory, a data memory, a write buffer/cache, a read buffer/cache, a data buffer/cache, a map buffer/cache, and the like.

The processor 134 controls all operations of the memory system 110. In particular, the processor 134 controls a program operation or a read operation for the memory device 150 in response to a write request or a read request from the host 102, respectively. The processor 134 drives firmware, referred to as a flash translation layer (FTL), to control general operations of the memory system 110. The processor 134 may include one or more processors, each of which may be realized by a microprocessor or a central processing unit (CPU).

For instance, the controller 130 performs an operation requested by the host 102 on the memory device 150, that is, performs a command operation, corresponding to a command received from the host 102, on the memory device 150 through the use of the processor 134 embodied by a microprocessor or a central processing unit (CPU). The controller 130 may perform, as a foreground operation, a command operation corresponding to a command received from the host 102. For example, the foreground operation includes a program operation corresponding to a write command, a read operation corresponding to a read command, an erase operation corresponding to an erase command, or a parameter set operation corresponding to a set command such as a set parameter command or a set feature command.

Meanwhile, when a write request including a high speed operation mode is received from the host 102, the controller 130 stores data in the first region 1501A of the nonvolatile memory 1501 in order to process the write request at a high speed. As described above, while the controller 130 processes the write request received from the host 102 and including the high speed operation mode, the first region 1501A may not have a sufficient free storage space capable of storing data. As described above, when the free storage space in the first region 1501A is not sufficient, it is necessary to perform a migration operation through the use of the migration module 136 in order to generate a free storage space in the first region 1501A.

In order to manage a storage space of the first region 1501A, the migration module 136 may determine whether to start the migration operation using various methods. That is, in a first method, when the free storage space in the first region 1501A is equal to or smaller than a preset amount of space or when there is no free storage space in the first region 1501A, the migration module 136 may perform the migration operation. In a second method, the migration module 136 may start the migration operation periodically at predetermined times. In a third method, the migration module 136 may perform the migration operation whenever an idle time of the memory device 150 is detected.

The migration module 136 may check whether to perform the migration operation as described above, and perform the migration operation using various methods. The migration operation may include an operation of moving data from the first region 1501A to the second region 1501B or an operation of swapping type information of at least one memory block included in the first region 1501A for type information of at least one free block included in the second region 1501B. The migration operation performed by the migration module 136 will be described in detail with reference to FIG. 5 to FIGS. 7A and 7B.

Figure 2:
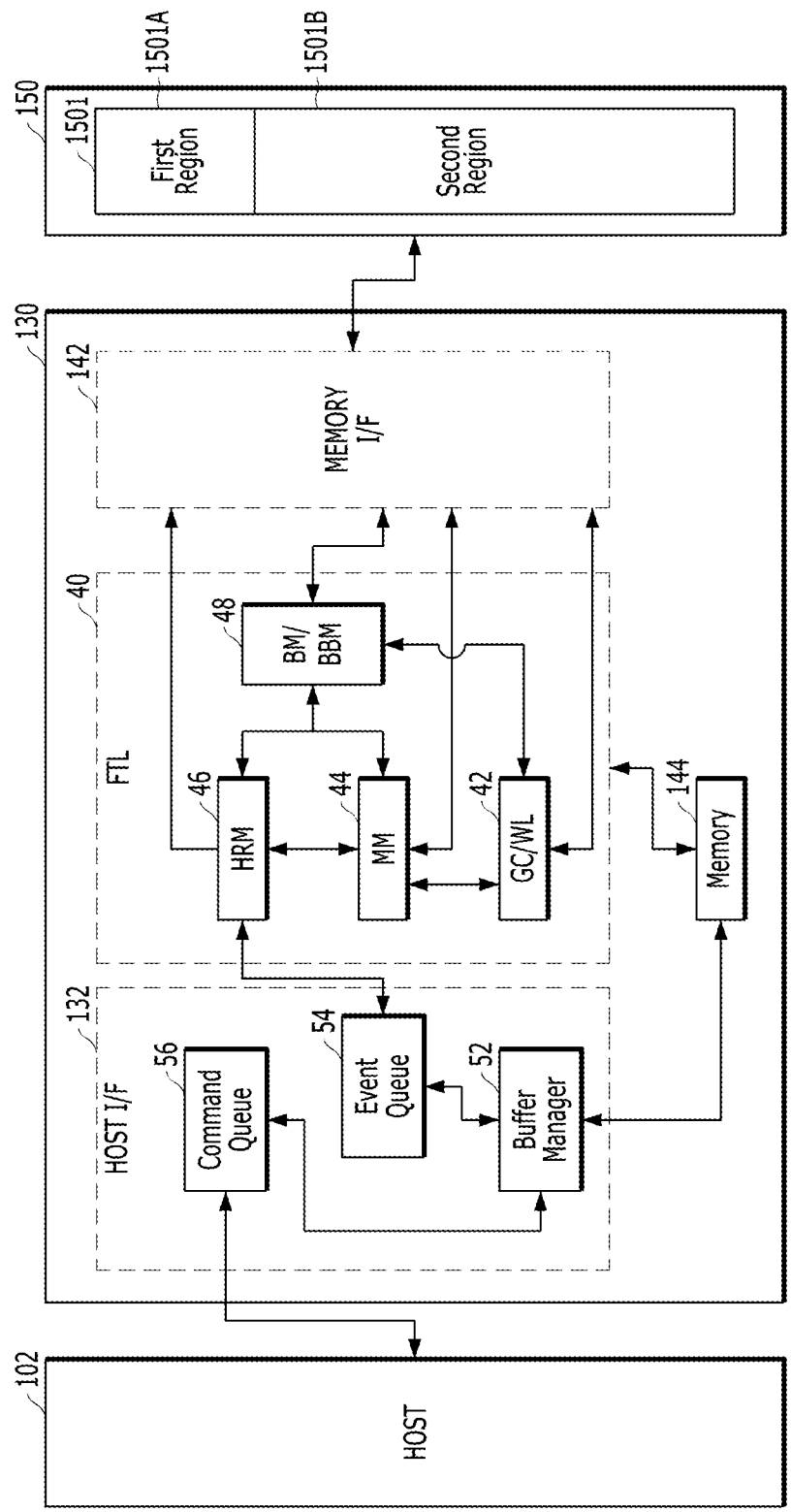
FIG. 2 is a diagram for illustrating a controller in a memory system in accordance with an embodiment.

FIG. 2 illustrates a controller in a memory system in accordance with an embodiment. The controller of FIG. 2 may correspond to the controller 130 of FIG. 1.

Referring to FIG. 2, the controller 130 cooperating with a host 102 and a memory device 150 may include a host I/F 132, a flash translation layer unit (FTL) 40, a memory I/F 142, and a memory 144.

The host I/F 132 receives a command, data, and the like transferred from the host 102. For example, the host I/F 132 may include a command queue 56 that may sequentially store host tasks including the command, the data, and the like transferred from the host 102 and then output the host tasks according to the stored order, a buffer manager 52 that may classify the host tasks transferred from the command queue 56 or adjust the processing order of the host tasks, and an event queue 54 for sequentially transferring events for processing the host tasks and the like transferred from the buffer manager 52. In the following description, the host task is used as a term that means an operation in which the controller 130 writes data in the memory device 150 or read data written in the memory device 150 in response to a command transmitted from the host 102.

A plurality of commands and data having substantially the same characteristics may be continuously transferred from the host 102 or a plurality of commands and data having different characteristics may be transferred from the host 102. For example, a plurality of read commands for reading data may be transferred, or read commands and program commands may be alternately transferred from the host 102. The host I/F 132 sequentially stores the commands, the data, and the like transferred from the host 102 in the command queue 56. Then, an operation to be performed by the controller 130 may be predicted according to the characteristics of the commands, the data, and the like transferred from the host 102, and the processing order or the priority of the commands, the data, and the like may be determined based on the prediction result. Furthermore, the buffer manager 52 in the host I/F 132 may determine whether to store the commands, the data, and the like in the memory 144 or to transfer them to the FTL 40 according to the characteristics of the commands, the data, and the like transferred from the host 102. The event queue 54 may receive events, which need to be internally performed and processed by the memory system or the controller 130, from the buffer manager 52 according to the commands, the data, and the like transferred from the host 102, and then transfer the events to the FTL 40 in the received order.

In accordance with an embodiment, the FTL 40 may include a host request manager (HRM) 46 for managing the events received from the event queue 54, a map data manager (map manager (MM)) 44 for managing map data, a status manager (GC/WL) 42 for performing garbage collection or wear leveling, and a block manager (BM/BBM) 48 for executing a command on a block in the memory device 150.

For example, the HRM 46 may process read and program commands and an event-based request received from the host I/F 132 by using the MM 44 and the BM/BBM 48. The HRM 46 may send an inquiry request to the MM 44 in order to understand a physical address corresponding to a logical address of the received request, transmit a flash read request to the memory I/F 142 with respect to the physical address, and process the read request. On the other hand, the HRM 46 may program data to an unwritten (dataless) specific page of the memory device 150 by transmitting a program request to the BM/BBM 48, and then update content for the programmed data to mapping information of logical-physical addresses by transmitting a map update request for the program request to the MM 44.

The BM/BBM 48 may convert a program request requested by the HRM 46, the MM 44, and the GC/WL 42 into a program request for the memory device 150, and manage blocks in the memory device 150. In order to maximize the program or write performance of the memory system 110, the BM/BBM 48 may collect a program request and send a flash program request for multiple planes and one-shot program operations to the memory I/F 142. Furthermore, in order to maximize parallel processing of multiple channels and multidirectional flash controllers, the BM/BBM 48 may also transmit various excellent flash program requests to the memory I/F 142.

On the other hand, the BM/BBM 48 may manage a flash block according to the number of valid pages. When a free block is needed, the BM/BBM 48 may select and erase a block with no valid page. When garbage collection is needed, the BM/BBM 48 may select a block including the smallest number of valid pages. In order for the BM/BBM 48 to have sufficient empty blocks, the GC/WL 42 may perform garbage collection to collect valid data, move the collected valid data to an empty block, and delete blocks which have had the moved valid data. When the BM/BBM 48 provides the GC/WL 42 with information on a block to be deleted, the GC/WL 42 may first check all flash pages of the block to be deleted and check whether each page is valid. For example, in order to determine the validity of each page, the GC/WL 42 may identify a logical address recorded in an out-of-band (OOB) area of each page and then compare an actual address of the page with an actual address mapped to a logical address obtained from the inquiry request of the MM 44. The GC/WL 42 may transmit a program request of each valid page to the BM/BBM 48. When the program operation is completed, a mapping table may be updated through the update of the MM 44.

The MM 44 may manage a logical-physical mapping table and process requests such as inquires and updates generated by the HRM 46 and the GC/WL 42. The MM 44 may store the entire mapping table in a flash memory and cache mapping items according to the capacity of the memory 144. When a map cache miss occurs while the MM 44 processes the inquiry and update requests, the MM 44 may transmit a read request to the memory I/F 142 and load a mapping table stored in the memory device 150. When the number of dirty cache blocks of the MM 44 exceeds a specific threshold value, the MM 44 may generate a clean cache block by transmitting a program request to the BM/BBM 48 and store a dirty map table in the memory device 150.

On the other hand, when garbage collection is performed, the HRM 46 may program the latest version of data for substantially the same logical address of a page and issue an update request simultaneously while the GC/WL 42 copies a valid page. When the GC/WL 42 requests a map update in a state in which the copy of the valid page has not been normally completed, the MM 44 may not update the mapping table. The MM 44 may perform the map update only when the latest mapping table still indicates a previous actual address, thereby ensuring accuracy.

In accordance with an embodiment, at least one of the GC/WL 42, the MM 44, and the BM/BBM 48 may include the migration module 136 of FIG. 1. For example, at least one of the GC/WL 42, the MM 44, and the BM/BBM 48 may perform a background operation even though there is no command transferred from the host I/F 132. The migration module 136 will be described in detail with reference to FIG. 5 to FIGS. 7A and 7B.

The memory I/F 142 serves as a memory/storage interface that performs interfacing between the controller 130 and the memory device 150 in order for the controller 130 to control the memory device 150 in response to a request from the host 102.

Furthermore, the memory I/F 142 may include a first device command queue PQ and a second device command queue SQ as a plurality of device command queues capable of storing commands for performing tasks with different properties. Each of the first device command queue PQ and the second device command queue SQ may store one or more device tasks (DT). The device task is a term used to mean a task in which the controller 130 performs a background operation of the memory device 150 in a specific state independently of the host 102, and may include a background operation such as garbage collection, wear leveling, mapping table update, a rebuild operation by SPO, and read reclaim.

The memory device 150 may include at least one nonvolatile memory. The nonvolatile memory may include a plurality of memory blocks. The plurality of memory blocks may be composed of a single level cell (SLC) memory block, a multi-level cell (MLC) memory block, and the like according to the number of bits that may be stored or represented in one memory cell. The SLC memory block includes a plurality of pages implemented with memory cells that store 1-bit data in one memory cell and has fast data operation performance and high durability. The MLC memory block includes a plurality of pages implemented with memory cells that store multiple bits (for example, 2 or more bits) of data in one memory cell, and may have a larger data storage space than the SLC memory block, that is, may be highly integrated. Particularly, the memory device 150 may include, as MLC memory blocks, a triple level cell (TLC) memory block including a plurality of pages implemented with memory cells capable of storing 3-bit data in one memory cell, a quadruple level cell (QLC) memory block including a plurality of pages implemented with memory cells capable of storing 4-bit data in one memory cell, a multiple level cell memory block including a plurality of pages implemented with memory cells capable of storing 5 or more bits of data in one memory cell, and the like, in addition to the MLC memory block including a plurality of pages implemented with memory cells capable of storing 2-bit data in one memory cell.

Hereinafter, in an embodiment, for convenience of description, an example in which the memory device 150 is implemented with a nonvolatile memory such as a flash memory, for example, a NAND flash memory, will be described. However, in another embodiment, the memory device 150 may be implemented as any one of memories such as a phase change random access memory (PCRAM), a resistive random access memory (RRAM (ReRAM)), a ferroelectrics random access memory (FRAM), and a spin transfer torque magnetic random access memory (STT-RAM (STT-MRAM)).

Figure 3:
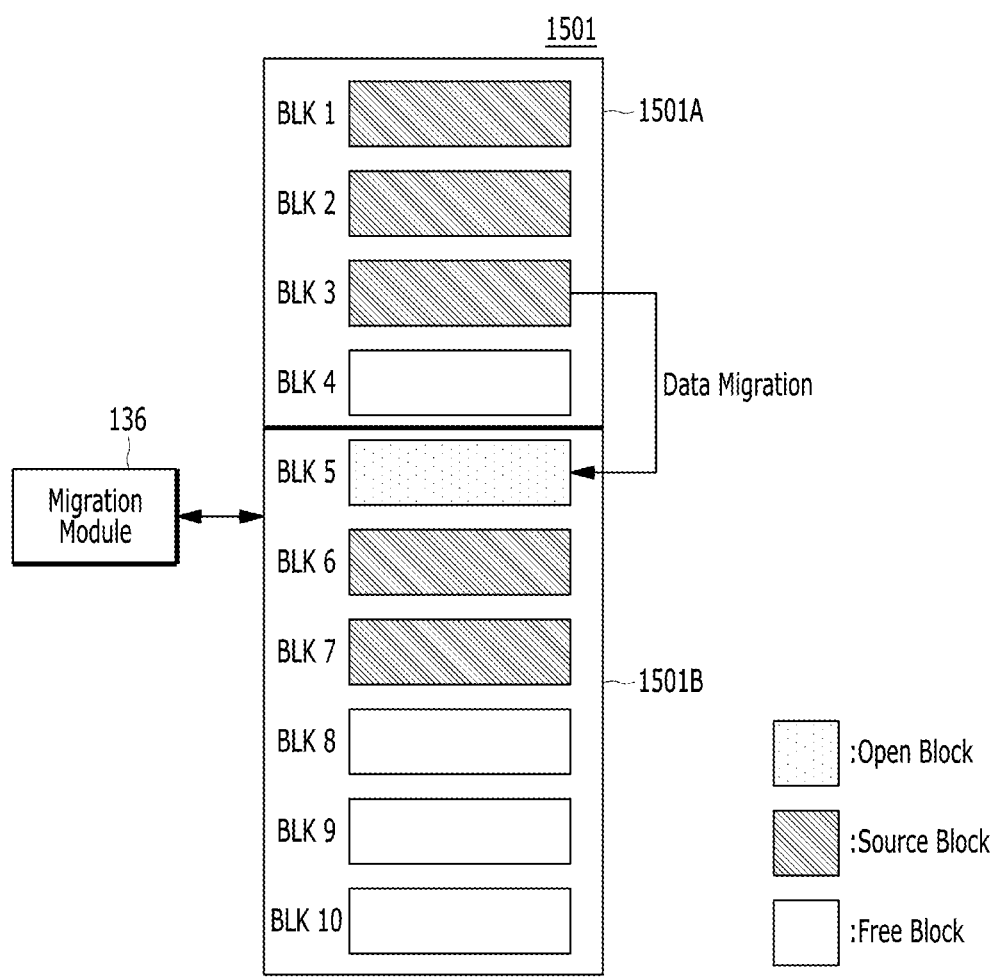
FIG. 3 is a diagram illustrating a migration operation in accordance with an embodiment.

FIG. 3 is a diagram illustrating the migration operation of the memory system 110 shown in FIG. 1 according to an embodiment.

Referring to FIGS. 1 and 3, the memory system 110 may include the migration module 136 and the nonvolatile memory 1501 including a plurality of memory blocks. The nonvolatile memory 1501 may divide the plurality of memory blocks into the first region 1501A and the second region 1501B. For example, when the nonvolatile memory 1501 includes a plurality of memory blocks BLK1 to BLK10, the first region 1501A may include the first memory block BLK1, the second memory block BLK2, the third memory block BLK3, and the fourth memory block BLK4. The second region 1501B may include the fifth memory block BLK5, the sixth memory block BLK6, the seventh memory block BLK7, the eighth memory block BLK8, the ninth memory block BLK9, and the tenth memory block BLK10. The scope of the present disclosure is not limited thereto.

Each of the plurality of memory blocks BLK1 to BLK10 may be classified into any of a free block FB, an open block OB or active block, and a source block SB. The free block FB indicates a block where no data is stored. For example, in FIG. 3, the fourth memory block BLK4 of the first region 1501A and the eighth to tenth memory blocks BLK8 to BLK10 of the second region 1501B may be free blocks. The open block OB is a block that stores data and includes at least one empty page capable of programming data therein. For example, the fifth memory block BLK5 of the second region 1501B may be an open block. The source block SB is a block that stores data and is in a closed state where a page capable of programming data therein is exhausted. That is, the source block includes no empty page capable of programming data therein. For example, in FIG. 3, the first memory block BLK1, the second memory block BLK2, and the third memory block BLK3 of the first region 1501A and the sixth memory block BLK6 and the seventh memory block BLK7 of the second region 1501B may be source blocks.

The migration module 136 checks source blocks among the memory blocks BLK1 to BLK4 in the first region 1501A. Next, the migration module 136 selects, as a victim block, a source block with the number of valid pages, which is equal to or smaller than an arbitrarily set threshold value, among the checked source blocks. The reason for selecting the source block with the smaller number of valid pages as the victim block is because, when the migration operation is performed on a source block with the large number of valid pages, a time and cost required for performing data migration, i.e., the use of resources in the memory system 110, are increased and the life time of the memory device 150 may be further reduced. Next, the migration module 136 selects, as a destination block, an open block in the second region 1501B, which includes a page capable of programming valid data included in the victim block of the first region 1501A, and copies the valid data included in the victim block into the destination block for storage. Meanwhile, the migration module 136 may set a free block in the second region 1501B, in which no data is stored, as the destination block, and copy the valid data included in the victim block of the first region 1501A into the destination block for storage. Then, when the valid data is copied and stored in the destination block, the migration module 136 may erase all data stored in the victim block of the first region 1501A.

For example, the migration module 136 checks source blocks among the first to fourth memory blocks BLK1 to BLK4 of the first region 1501A. The migration module 136 may check that the source blocks are the first to third memory blocks BLK1 to BLK3 (hereinafter, referred to as first to third source blocks) among the first to fourth memory blocks BLK1 to BLK4 of the first region 1501A. Next, in a case where the migration module 136 selects, as a victim block, a source block in which the number of valid pages is equal to or smaller than a threshold value of 65, when it is assumed that the number of valid pages of the first source block BLK1 is 80, the number of valid pages of the second source block BLK2 is 70, and the number of valid pages of the third source block BLK3 is 30, the migration module 136 may select, as the victim block, the third source block BLK3, in which the number of valid pages is equal to or smaller than 65. Furthermore, the migration module 136 may copy valid data stored in the selected victim block BLK3 into the fifth memory block BLK5, which is the open block in the second region 1501B, for storage. Then, the migration module 136 may erase all data stored in the third source block BLK3, which is the victim block in the first region 1501A, and set the third source block BLK3 as a free block.

In the aforementioned migration operation, in order to move valid data from the source block in the first region 1501A to the open block in the second region 1501B, the controller 130 may read valid data from the source block of the memory device 150, load the read valid data into the memory 144, and then program the read valid data stored in the memory 144 into the open block.

Figure 4:
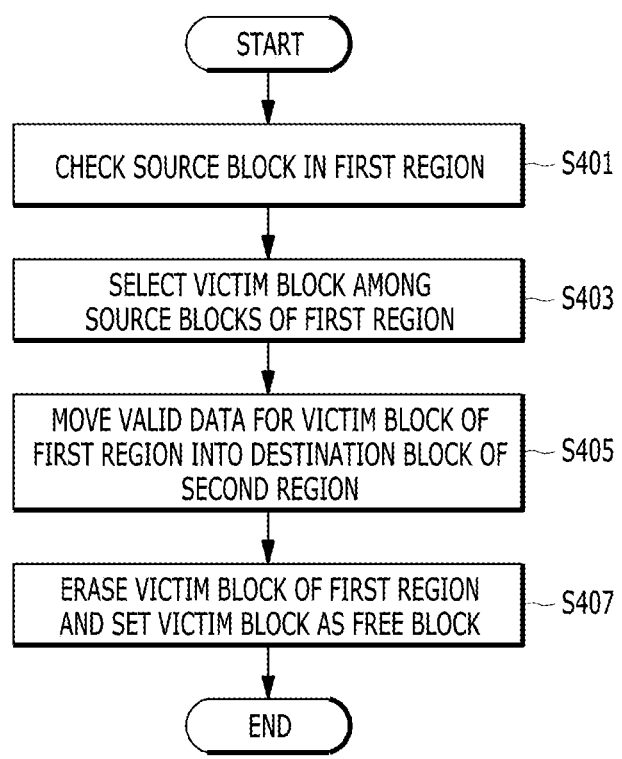
FIG. 4 is a flowchart illustrating the migration operation.

FIG. 4 is a flowchart illustrating the migration operation described with reference to FIG. 3.

Referring to FIG. 4, in step S401, the migration module 136 checks source blocks among the plurality of memory blocks BLK1 to BLK4 in the first region 1501A. In step S403, the migration module 136 selects, as a victim block, a source block with the smaller number of valid pages than an arbitrarily set threshold value among the checked source blocks in the first region 1501A. The reason for selecting the source block with the smaller number of valid pages as the victim block is because, when the migration operation is performed on a source block with the larger number of valid pages, a time and cost required for performing data migration, i.e., the use of resources in the memory system, are increased and the life time of the memory device 150 may be further reduced.

In step S405, the migration module 136 selects, as a destination block, an open block in the second region 1501B, which has a page capable of programming valid data therein, and copies valid data stored in the victim block of the first region 1501A into the destination block. Alternatively, the destination block may be selected from free blocks included in the second region 1501B.

In step S407, when the valid data stored in the victim block of the first region 1501A is copied into the destination block in the second region 1501B, the migration module 136 may erase all data stored in the victim block of the first region 1501A, and then set the victim block as a free block.

In such a manner, the controller 130 may manage the storage space of the first region 1501A. When type information of the source block included in the first region 1501A is swapped for type information of the destination block in the second region 1501B, the controller 130 may manage the storage space of the first region 1501A more efficiently without moving valid data of the source block included in the first region 1501A to the destination block of the second region 1501B. This will be described with reference to FIG. 5 to FIGS. 7A and 7B.

FIG. 5 to FIGS. 7A and 7B are diagrams for explaining an operation of a migration module 135 in accordance with an embodiment. FIG. 5 to FIGS. 7A and 7B illustrate a migration operation for more efficiently managing a storage space of a first region 1501A in a nonvolatile memory 1501.

Figure 5:
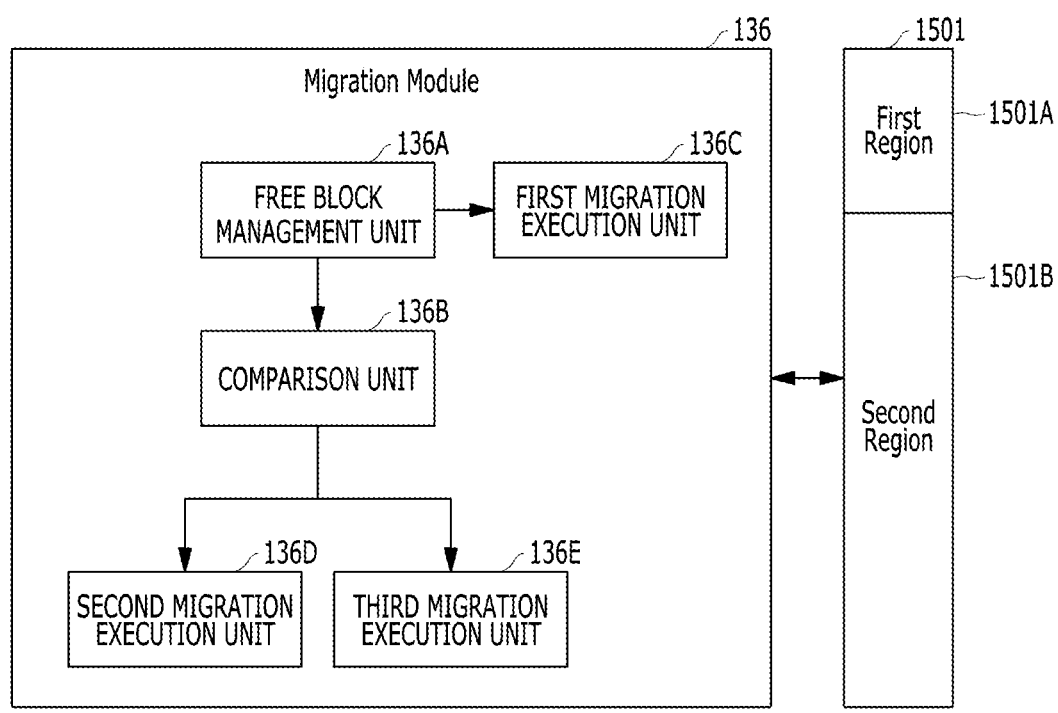
Figure 6:
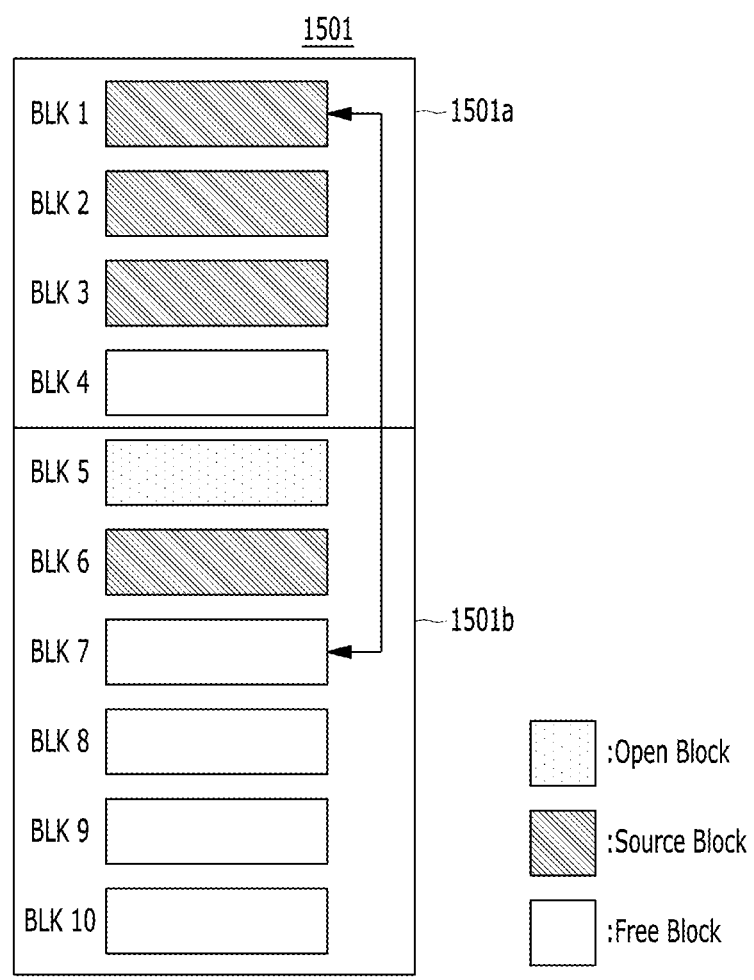

Referring to FIG. 5, the migration module 136 may include a free block management unit 136A, a comparison unit 136B, a first migration execution unit 136C, a second migration execution unit 136D, and a third migration execution unit 136E.

The free block management unit 136A checks the number of free blocks among a plurality of memory blocks of a second region 1501B included in the nonvolatile memory 1501, and checks whether the number of free blocks is equal to or greater than a first threshold value TH1. When the number of free blocks in the second region 1501B is equal to or greater than the first threshold value TH1, the free block management unit 136A manages the storage space of the first region 1501A using the first migration execution unit 136C. On the other hand, when the check result of the free block management unit 136A indicates that the number of free blocks in the second region 1501B is smaller than the first threshold value TH1, the comparison unit 136B selects, as a first comparison block, a source block with the smallest number of valid pages among source blocks included in the first region 1501A and selects, as a second comparison block, a source block with the smallest number of valid pages among source blocks included in the second region 1501B. Then, the comparison unit 136B compares the number of valid pages of the first comparison block and the number of valid pages of the second comparison block. When the comparison result indicates that the number of valid pages of the second comparison block is equal to or smaller than the number of valid pages of the first comparison block, the comparison unit 136B transmits the comparison result to the second migration execution unit 136D to manage the storage space of the first region 1501A. On the other hand, when the comparison result indicates that the number of valid pages of the second comparison block is larger than the number of valid pages of the first comparison block, the comparison unit 136B transmits the comparison result to the third migration execution unit 136E to manage the storage space of the first region 1501A.

Specifically, the free block management unit 136A checks whether the number of free blocks in the second region 1501B is equal to or greater than the first threshold value TH1. The reason for checking the number of free blocks of the second region 1501B is because, when the number of free blocks of the second region 1501B is equal to or greater than the first threshold value TH1, it is possible to swap type information of the victim block selected in the first region 1501A for type information of the free block selected in the second region 1501B without performing a process of changing a source block included in the second region 1501B to a free block. That is, by omitting the process of changing the source block included in the second region 1501B to the free block, it is possible to shorten a time for generating a free block in the first region 1501A.

When the number of free blocks in the second region 1501B is equal to or greater than the first threshold value TH1, the free block management unit 136A transmits the result that the number of free blocks in the second region 1501B is equal to or greater than the first threshold value TH1 to the first migration execution unit 136C to manage the storage space of the first region 1501A. Hereinafter, the first migration execution unit 136C will be described in detail with reference to FIG. 6. The first migration execution unit 136C checks source blocks among the plurality of memory blocks BLK1 to BLK4 in the first region 1501A. For example, the source blocks among the plurality of memory blocks BLK1 to BLK4 in the first region 1501A may be the first memory block BLK1, the second memory block BLK2, and the third memory block BLK3. For convenience of description, the first memory block to the third memory block BLK1 to BLK3 will be referred to as first to third source blocks.

Next, the first migration execution unit 136C selects a victim block from the first to third source blocks BLK1 to BLK3 in the first region 1501A. In the method of selecting the victim block from the first to third source blocks BLK1 to BLK3 in the first region 1501A, a source block with the larger number of valid pages than a second threshold value TH2 among the first to third source blocks BLK1 to BLK3 in the first region 1501A may be selected as the victim block, or a source block with the largest number of valid pages among the first to third source blocks BLK1 to BLK3 in the first region 1501A may be selected as the victim block.

Hereinafter, a case where a source block with the larger number of valid pages than the second threshold value TH2 (for example, 70) among the first to third source blocks BLK1 to BLK3 in the first region 1501A is selected as the victim block will be described as an example. For example, when the number of valid pages of the first source block BLK1 of the first region 1501A is 80, the number of valid pages of the second source block BLK2 is 65, and the number of valid pages of the third source block BLK3 is 60, the first migration execution unit 136C may select the first source block BLK1 with the larger number of valid pages than 70, which is the second threshold value TH2, as the victim block.

Next, the first migration execution unit 136C selects a destination block among the plurality of free blocks in the second region 1501B in correspondence to the number of victim blocks selected in the first region 1501A. For example, referring to FIG. 6, since the number of victim blocks selected in the first region 1501A is 1, the first migration execution unit 136C selects one of the plurality of free blocks in the second region 1501B as the destination block. In such a case, the destination block may be selected based on the number of erase/write (E/W) of the plurality of free blocks in the second region 1501B.

Next, the first migration execution unit 136C swaps type information of the victim block of the first region 1501A for type information of the destination block of the second region 1501B. The type information of the victim block of the first region 1501A may include storage position information of the victim block in the first region 1501A and the type information of the destination block of the second region 1501B may include storage position information of the destination block in the second region 1501B. The storage position information may include a physical address. As described above, a source block having the larger number of valid pages than the second threshold value TH2 is selected as the victim block from among the source blocks in the first region 1501A, and the type information of the victim block selected in the first region 1501A is swapped for the type information of the destination block selected in the second region 1501B, so that it is possible to reduce a data migration time and cost, i.e., the use of resources in the memory system, due to data migration execution. Furthermore, no erase operation is performed on the victim block in the first region 1501A, so that it is possible to further increase the lifetime of the memory device 150. And the first migration execution unit 136C updates the mapping table based on the swapped type information, e.g., swapped physical address.

Referring back to FIG. 5, when the number of free blocks among the plurality of memory blocks in the second region 1501B is smaller than the first threshold value TH1, the free block management unit 136A transmits the result that the number of free blocks in the second region 1501B is smaller than the first threshold value TH1 to the comparison unit 136B to compare between the number of valid pages of the first comparison block in the first region 1501A and the number of valid pages of the second comparison block in the second region 1501B.

First, when the comparison result of the comparison unit 136B indicates that the number of valid pages of the first comparison block in the first region 1501A is equal to or larger than the number of valid pages of the second comparison block in the second region 1501B, the comparison unit 136B transmits the comparison result to the second migration execution unit 136D to manages the storage space of the first region 1501A. In this regard, the second migration execution unit 136D will be described with reference to FIGS. 7A and 7B.

On the other hand, when the number of valid pages of the first comparison block in the first region 1501A is smaller than the number of valid pages of the second comparison block in the second region 1501B, the comparison unit 136B transmits the comparison result to the third migration execution unit 136E to manages the storage space of the first region 1501A. Since an operation of the third migration execution unit 136E is substantially the same as the operation described with reference to FIG. 3 and FIG. 4, a description thereof will be omitted herein.

Figure 7A:
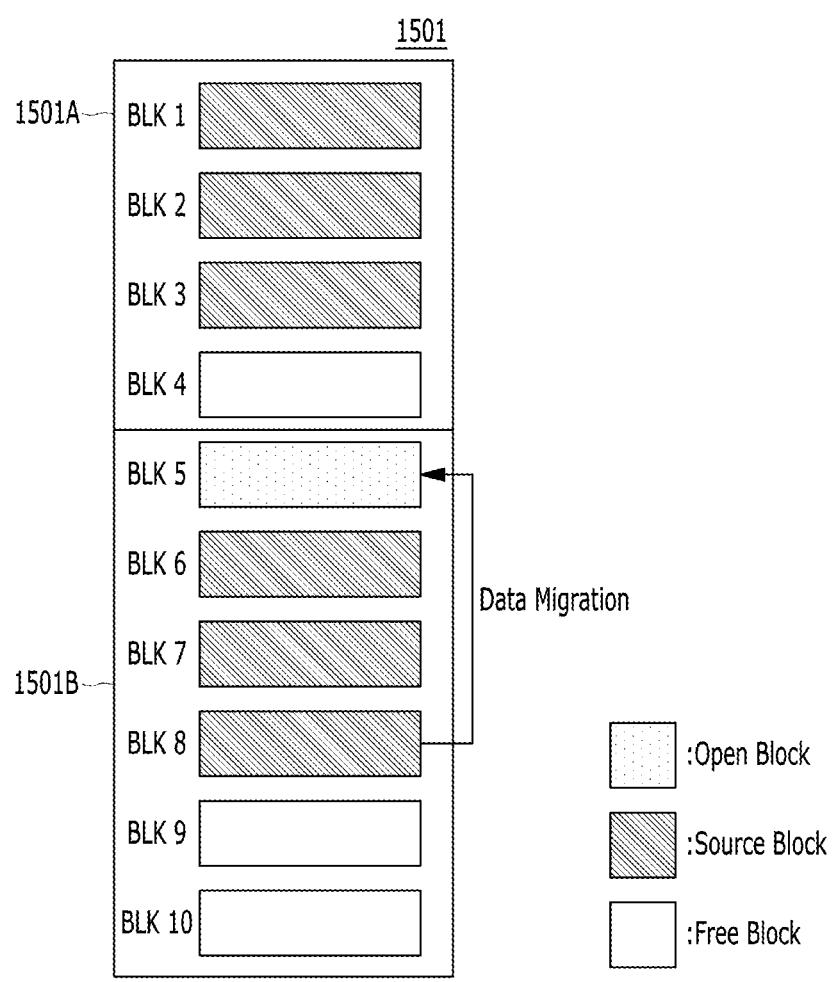

Referring to FIG. 7A, as a result of checking whether the number of free blocks among the plurality of memory blocks in the second region 1501B is smaller than the first threshold value TH1 (for example, 3), the free block management unit 136A may recognize that the number of free blocks in the second region 1501B is 2 which is smaller than the first threshold value TH1.

Next, the comparison unit 136B checks source blocks among the plurality of memory blocks BLK1 to BLK10 in the first region 1501A and the second region 1501B. For example, the source blocks among the plurality of memory blocks BLK1 to BLK4 in the first region 1501A may include the first memory block BLK1, the second memory block BLK2, and the third memory block BLK3. The source blocks among the plurality of memory blocks BLK5 to BLK10 in the second region 1501B may include the sixth memory block BLK6, the seventh memory block BLK7, and the eighth memory block BLK8. For convenience of description, the first to third memory blocks BLK1 to BLK3 in the first region 1501A are represented as first to third source blocks and the sixth to eighth memory blocks BLK6 to BLK8 in the second region 1501B are represented as sixth to eighth source blocks.

Next, the comparison unit 136B selects a first comparison block and a second comparison block from the plurality of source blocks in the first region 1501A and the second region 1501B. In the method of selecting the first comparison block and the second comparison block from the source blocks in the first region 1501A and the second region 1501B, a source block with the smallest number of valid pages among the source blocks in each of the first region 1501A and the second region 1501B may be selected as the comparison block, or a source block with the smaller number of valid pages than an arbitrarily set threshold value among the source blocks in each of the first region 1501A and the second region 1501B may be selected as the comparison block.

For example, a case where the comparison unit 136B selects a source block with the smallest number of valid pages among the source blocks in each of the first region 1501A and the second region 1501B as the comparison block will be described. For example, in the first region 1501A, when the number of valid pages of the first source block BLK1 is 80, the number of valid pages of the second source block BLK2 is 65, and the number of valid pages of the third source block BLK3 is 60, the comparison unit 136B may select the third source block BLK3 in the first region 1501A as the first comparison block. In the second region 1501B, when the number of valid pages of the sixth source block BLK6 is 60, the number of valid pages of the seventh source block BLK7 is 50, and the number of valid pages of the eighth source block BLK8 is 40, the comparison unit 136B may select the eighth source block BLK8 as the second comparison block. Then, the comparison unit 136B compares the number of valid pages of the first comparison block and the number of valid pages of the second comparison block. Since the number of valid pages of the first comparison block in the first region 1501A is 60 and the number of valid pages of the second comparison block in the second region 1501B is 40, it can be seen that the second comparison block of the second region 1501B has the smallest number of valid pages. Accordingly, the comparison unit 136B transmits the comparing result that the number of valid pages of the second comparison block is smaller than the number of valid pages of the first comparison block to the second migration execution unit 136D to manage the storage space of the first region 1501A.

The second migration execution unit 136D selects the source block, which is the second comparison block in the second region 1501B, as a victim block, and copies valid data of the selected victim block into an open block in the second region 1501B for storage. For example, the second migration execution unit 136D may select the eighth source block BLK8, which is the second comparison block in the second region 1501B, as the victim block. Then, the second migration execution unit 136D may copy valid data stored in the victim block of the second region 1501B into the fifth memory block BLK5, which is the open block in the second region 1501B, for storage. Then, the second migration execution unit 136D may perform an erase operation on the eighth memory block BLK8, which is the victim block of the second region 1501B, and set the eighth memory block BLK8 as a free block. Then, the second migration execution unit 136D may select the eighth memory block BLK8, which has been set as the free block, as a destination block.

Next, the second migration execution unit 136D selects the source blocks in a descending order of the number of valid pages among the source blocks in the first region 1501A in correspondence to the number of destination blocks in the second region 1501B, and selects a victim block. For example, since the memory block selected as the destination block in the second region 1501B is one, that is, only the eighth memory block BLK8 is selected as the destination block, the second migration execution unit 136D may select one victim block from among the source blocks in the first region 1501A. That is, the second migration execution unit 136D may select, as the victim block, the first memory block BLK1 that is a source block with the largest number of valid pages from among the source blocks in the first region 1501A.

Figure 7B:
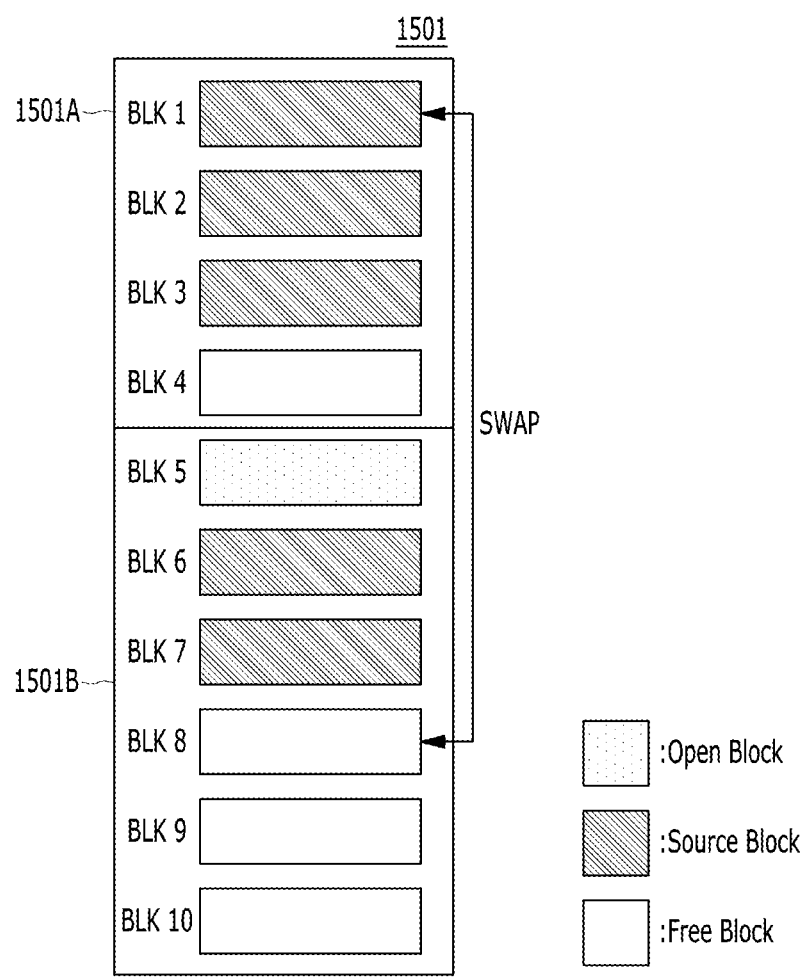

Next, referring to FIG. 7B, the second migration execution unit 136D swaps type information of the victim block selected in the first region 1501A for type information of the destination block selected in the second region 1501B. For example, by swapping the type information of the first memory block BLK1, which is the victim block selected in the first region 1501A, for the type information of the eighth memory block BLK8, which is the destination block selected in the second region 1501B, the second migration execution unit 136D may swap storage position information of the victim block of the first region 1501A for storage position information of the destination block of the second region 1501B. As described above, the source block with the largest number of valid pages in the first region 1501A is selected as the victim block and the type information of the victim block selected in the first region 1501A is swapped for the type information of the destination block selected in the second region 1501B, so that it is possible to ensure a free storage space of the first region 1501A. Accordingly, it is possible to reduce a time and cost required for performing the data migration operation, i.e., to reduce the use of resources in the memory system. Furthermore, no erase operation is performed on the victim block selected in the first region 1501A, so that it is possible to further increase the lifetime of the memory device 150. And the second migration execution unit 136D updates the mapping table based on the swapped type information, e.g., swapped physical address.

Figure 9:
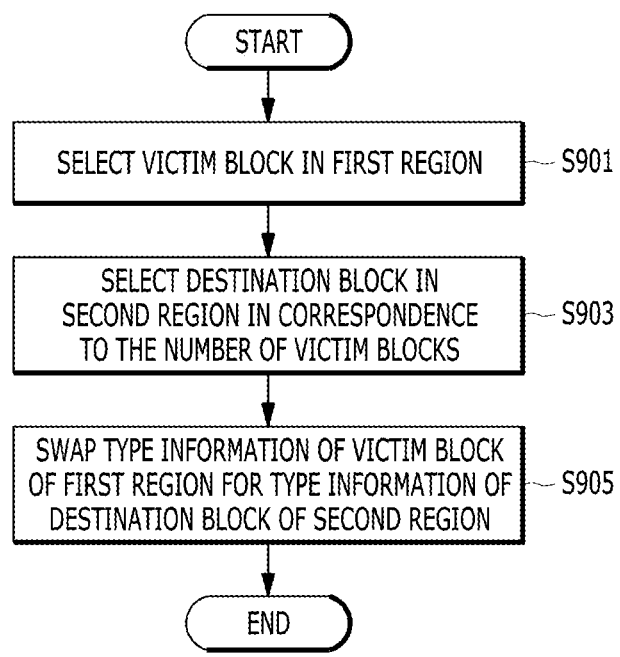
Figure 10:
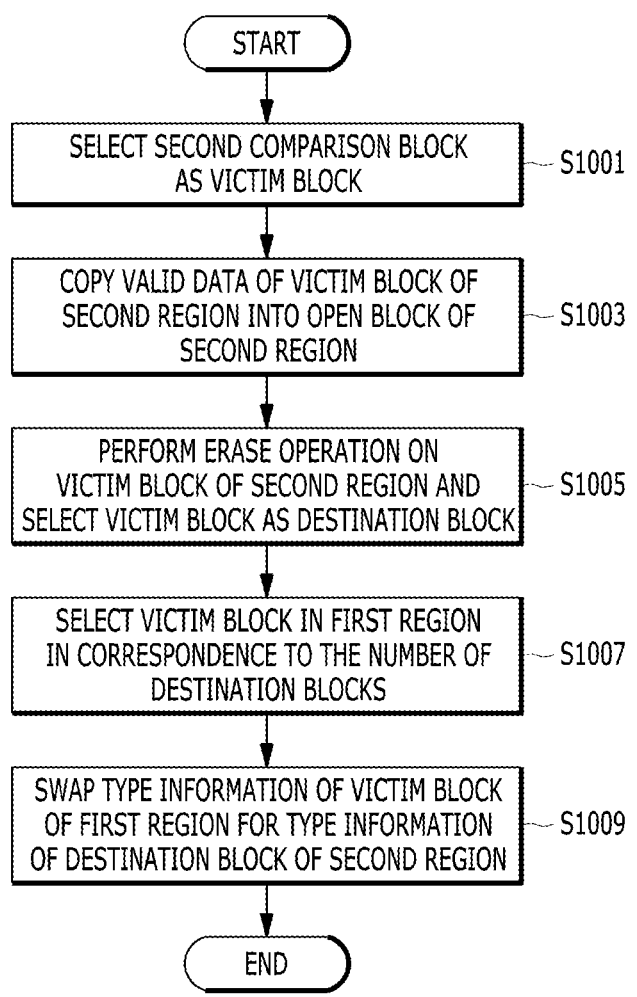

FIG. 8 to FIG. 10 are diagrams for illustrating a migration operation in accordance with an embodiment. FIG. 8 and FIG. 9 relate to a migration operation for more efficiently managing the storage space of the first region 1501A, and FIG. 10 relates to a general migration operation.

Referring to FIG. 8, in step S801, the migration module 136 checks the number of free blocks FBC_M among the plurality of memory blocks in the second region 1501B included in the nonvolatile memory 1501. In step S803, the migration module 136 checks whether the number of free blocks FBC_M included in the second region 1501B is equal to or greater than the first threshold value TH1.

As a result of the checking, when the number of free blocks FBC_M among the plurality of memory blocks in the second region 1501B is equal to or greater than the first threshold value TH1 (Yes), the migration module 136 performs a first migration operation using the first migration execution unit 136C in step S805. The first migration operation performed by the first migration execution unit 136C will be described with reference to FIG. 9.

On the other hand, when the number of free blocks FBC_M among the plurality of memory blocks in the second region 1501B is smaller than the first threshold value TH1 (No), the migration module 136 selects a source block with the smallest number of valid pages among the source blocks included in the first region 1501A as a first comparison block, and selects a source block with the smallest number of valid pages among the source blocks included in the second region 1501B as a second comparison block in step S807.

In step S809, the migration module 136 compares whether the number of valid pages of the first comparison block is larger than the number of valid pages of the second comparison block. As a result of the comparison, when the number of valid pages of the first comparison block is larger than the number of valid pages of the second comparison block (Yes), the migration module 136 manages the storage space of the first region 1501A using the second migration execution unit 136D in step S811. A second migration operation performed by the second migration execution unit 136D will be described with reference to FIG. 10.

On the other hand, when the number of valid pages of the first comparison block is smaller than or equal to the number of valid pages of the second comparison block (No), the migration module 136 manages the storage space of the first region 1501A using the third migration execution unit 136E in step S813. Since a third migration operation performed by the third migration execution unit 136E is substantially the same as in FIG. 4, a description thereof will be omitted herein.

FIG. 9 is a diagram illustrating the first migration operation in accordance with an embodiment. FIG. 9 is a diagram illustrating a case where the number of free blocks among the plurality of memory blocks in the second region 15016 is equal to or greater than the first threshold value TH1.

Referring to FIG. 8, in step S803, the migration module 136 checks whether the number of free blocks among the plurality of memory blocks in the second region 1501B is equal to or greater than the first threshold value TH1. The reason for checking the number of free blocks in the second region 1501B is because, when the number of free blocks in the second region 1501B is equal to or greater than the first threshold value TH1, it is possible to swap type information of a victim block selected in the first region 1501A for type information of a free block selected in the second region 1501B without performing a process of changing the source block included in the second region 1501B to a free block. That is, by omitting the process of changing the source block included in the second region 1501B to the free block, it is possible to shorten a time for generating a free block of the first region 1501A.

After it is determined in S803 that the number of free blocks among the plurality of memory blocks in the second region 1501B is equal to or greater than the first threshold value TH1, referring to FIG. 9, in step S901, the migration module 136 checks source blocks among the plurality of memory blocks in the first region 1501A and then selects a victim block from among the source blocks checked in the first region 1501A. In the method of selecting the victim block from among the source blocks in the first region 1501A, a source block with the larger number of valid pages than the arbitrarily set second threshold value TH2 among the source blocks checked in the first region 1501A may be selected as the victim block, or a source block with the largest number of valid pages among the source blocks checked in the first region 1501A may be selected as the victim block.

In step S903, the migration module 136 selects a destination block among the plurality of free blocks in the second region 1501B in correspondence to the number of victim blocks selected in the first region 1501A. In such a case, the destination block may be selected based on the number of E/W of the plurality of free blocks in the second region 1501B.

In step S905, the migration module 136 swaps type information of the victim block of the first region 1501A for type information of the destination block of the second region 15016. The type information of the victim block of the first region 1501A may include storage position information of the victim block in the first region 1501A, and type information of the destination block of the second region 1501B may include storage position information of the destination block in the second region 1501B. As described above, a source block having many valid pages in the first region 1501A is selected as the victim block and the type information of the victim block selected in the first region 1501A is swapped for the type information of the destination block selected in the second region 1501B, so that it is possible to reduce data migration time and cost (use of resources in the memory system) due to data migration execution. Furthermore, no erase operation is performed on the victim block selected in the first region 1501A, so that it is possible to further increase the lifetime of the memory device 150. And the migration module 136 updates the mapping table based on the swapped type information, e.g., swapped physical address.

FIG. 10 is a diagram illustrating the second migration operation in accordance with an embodiment. FIG. 10 is a diagram illustrating a case where the number of free blocks among the plurality of memory blocks in the second region 15016 is smaller than the first threshold value TH1 and the number of valid pages of the first comparison block of the first region 1501A is equal to or larger than the number of valid pages of the second comparison block of the second region 1501B.

Referring to FIG. 10, in step S1001, the migration module 136 selects a source block, which is the second comparison block in the second region 1501B, as a victim block. In step S1003, the migration module 136 copies valid data of the selected victim block into an open block in the second region 15016 for storage.

In step S1005, the migration module 136 may perform an erase operation on the victim block in the second region 1501B and set the victim block as a free block. Then, the migration module 136 may select the memory block, which has been set as the free block, as a destination block.

In step S1007, the migration module 136 selects one or more victim blocks among the source blocks in the first region 1501A in correspondence to the number of destination blocks of the second region 1501B. The victim blocks selected in the first region 1501A may be selected in a descending order of source blocks having the larger number of valid pages. That is, a source block having the larger number of valid page is selected as the victim block.

In step S1009, the migration module 136 swaps type information of the victim block selected in the first region 1501A for type information of the destination block selected in the second region 1501B. As described above, the source block with the large number of valid pages in the first region 1501A is selected as the victim block and the type information of the victim block selected in the first region 1501A is swapped for the type information of the destination block selected in the second region 1501B, so that it is possible to ensure a free storage space of the first region 1501A.

Accordingly, it is possible to reduce a time and cost required for performing the data migration operation, i.e., to reduce the use of resources in the memory system. Furthermore, no erase operation is performed on the victim block selected in the first region 1501A, so that it is possible to further increase the lifetime of the memory device.

Although various embodiments have been described for illustrative purposes, it will be apparent to those skilled in the art that various changes and modifications may be made without departing from the spirit and scope of the invention as defined in the following claims.

What is claimed is:

1. A memory system, comprising:
    a nonvolatile memory including a first region and a second region; and
    a controller configured to manage a migration operation for a plurality of memory blocks included in the first region and the second region,
    wherein the controller comprises:
    a migration module configured to perform the migration operation by selecting one or more victim blocks based on a number of valid pages of each memory block included in the first region when there is no free storage space in the first region, selecting one or more destination blocks in the second region that correspond to a number of victim blocks, and swapping type information of each of the one or more victim blocks in the first region for type information of a corresponding one of the one or more destination blocks in the second region, and
    wherein the migration module comprises:
    a free block management unit configured to check a number of free blocks among the memory blocks in the second region;
    a first migration execution unit configured to perform a first migration operation when the number of free blocks included in the second region is equal to or greater than a first threshold value;
    a comparison unit configured to select a first comparison block from among the memory blocks in the first region, select a second comparison block from among the memory blocks in the second region, and compare a number of valid pages of the first comparison block and a number of valid pages of the second comparison block when the number of free blocks included in the second region is smaller than the first threshold value;
    a second migration execution unit configured to perform a second migration operation when the number of valid pages of the first comparison block is larger than the number of valid pages of the second comparison block; and
    a third migration execution unit configured to perform a third migration operation when the number of valid pages of the first comparison block is smaller than or equal to the number of valid pages of the second comparison block.

2. The memory system of claim 1, wherein the first migration execution unit selects the one or more victim blocks from among a plurality of source blocks included in the first region, selects the one or more destination blocks from among the free blocks in the second region in correspondence to the number of selected one or more victim blocks, and swaps the type information of the one or more victim blocks of the first region for the type information of the one or more destination blocks of the second region, the one or more victim blocks having the maximum number of valid pages among the plurality of source blocks included in the first region.

3. The memory system of claim 1, wherein, when the number of free blocks among the memory blocks in the second region is smaller than the first threshold value, the comparison unit selects a source block with the smallest number of valid pages from among a plurality of source blocks included in the first region as the first comparison block and selects a source block with the smallest number of valid pages from among a plurality of source blocks included in the second region as the second comparison block.

4. The memory system of claim 1, wherein the second migration execution unit selects the second comparison block of the second region as a victim block, copies data stored in the victim block of the second region into an open block of the second region, perform an erase operation on the victim block, selects the victim block on which the erase operation is performed as a destination block, selects one or more victim blocks from the first region in correspondence to a number of destination blocks of the second region, and swaps type information of the selected one or more victim blocks of the first region for type information of the destination blocks of the second region.

5. The memory system of claim 4, wherein the one or more victim blocks selected in the first region are one or more source blocks having the maximum number of valid pages among a plurality of source blocks in the first region.

6. The memory system of claim 1, wherein each of the type information of the victim block in the first region and the type information of the destination block in the second region includes storage position information, and the storage position information includes a physical address.

7. The memory system of claim 1, wherein the third migration execution unit selects, as a victim block, a source block with a number of valid pages that is smaller than an arbitrarily set threshold value from among a plurality of source blocks in the first region, selects an open block in the second region as a destination block, and copies valid data stored in the victim block of the first region into the destination block of the second region.

8. The memory system of claim 7, wherein, after copying the valid data stored in the victim block of the first region into the destination block of the second region, the third migration execution unit erases all data stored in the victim block of the first region, and sets the victim block as a free block.

9. A method of operating a memory system that includes a nonvolatile memory including a first region and a second region and a controller for managing the nonvolatile memory, the method comprising:
    selecting a first comparison block from among memory blocks in the first region and selecting a second comparison block from among memory blocks in the second region;
    comparing a number of valid pages of the first comparison block and a number of valid pages of the second comparison block and selecting the second comparison block as a victim block when the number of valid pages of the second comparison block is smaller than the number of valid pages of the first comparison block;
    copying valid data stored in the victim block of the second region into an open block in the second region;

performing an erase operation on the victim block of the second region and selecting the victim block on which the erase operation has been performed as a destination block;

checking a number of destination blocks selected in the second region and selecting one or more victim blocks among a plurality of source blocks in the first region in correspondence to the number of destination blocks; and swapping type information of the one or more victim blocks selected in the first region for type information of the destination blocks of the second region.

10. The method of claim 9, further comprising, before the selecting of the first comparison block and the selecting of the second comparison block:

checking a number of free blocks among the memory blocks of the second region and checking whether the number of free blocks in the second region is equal to or larger than a threshold value.

11. The method of claim 10, further comprising, when the number of free blocks included in the second region is equal to or larger than the threshold value:

selecting the one or more victim blocks with the maximum number of valid pages among the plurality of source blocks included in the first region; and selecting one or more destination blocks from among the free blocks in the second region in correspondence to the one or more victim blocks.

12. The method of claim 10, further comprising, when the number of free blocks included in the second region is smaller than the threshold value:

selecting, as the first comparison block, a source block with the smallest number of valid pages among the plurality of source blocks included in the first region; and selecting, as the second comparison block, a source block with the smallest number of valid pages among a plurality of source blocks included in the second region.

13. The method of claim 9, wherein the selecting of the one or more victim blocks among a plurality of source blocks in the first region in correspondence to the number of destination blocks selected in the second region comprises:

sorting the numbers of valid pages of the plurality of source blocks in the first region in a descending order; and selecting, among the plurality of source blocks, source blocks having the maximum number of valid pages as the one or more victim blocks in correspondence to the number of destination blocks selected in the second region.

14. The method of claim 9, wherein each of the type information of the one or more victim blocks of the first region and the type information of the destination blocks of the second region includes storage position information, and the storage position information includes a physical address.

15. The method of claim 9, wherein, when the number of valid pages of the first comparison block is smaller than or equal to the number of valid pages of the second comparison block, the method further comprises:

selecting, as a victim block, a source block with a number of valid pages that is smaller than an arbitrarily set threshold value among the plurality of source blocks of the first region;

selecting, as a destination block, an open block in the second region; and copying valid data stored in the victim block of the first region into the destination block of the second region.

16. The method of claim 15, wherein, after copying the valid data stored in the victim block of the first region into the destination block of the second region, the method further comprises:

erasing all data stored in the victim block of the first region; and setting the victim block as a free block.

* * * * *